(12) United States Patent
Uecker et al.

(10) Patent No.: US 11,897,062 B2
(45) Date of Patent: Feb. 13, 2024

(54) SYSTEMS, METHODS, AND APPARATUS TO PREHEAT WELDING WIRE

(71) Applicant: Illinois Tool Works Inc., Glenview, IL (US)

(72) Inventors: James Uecker, Appleton, WI (US); Jake Zwayer, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 828 days.

(21) Appl. No.: 16/721,119

(22) Filed: Dec. 19, 2019

(65) Prior Publication Data

US 2020/0198044 A1    Jun. 25, 2020

Related U.S. Application Data

(60) Provisional application No. 62/782,027, filed on Dec. 19, 2018.

(51) Int. Cl.
  *B23K 9/10* (2006.01)
  *B23K 9/29* (2006.01)

(52) U.S. Cl.
  CPC ............ *B23K 9/1093* (2013.01); *B23K 9/295* (2013.01); *B23K 9/1006* (2013.01)

(58) Field of Classification Search
  CPC .... B23K 9/1093; B23K 9/295; B23K 9/1006; B23K 9/173; B23K 9/1023; B23K 9/123
  USPC .......................... 219/121.64, 121.63, 137 PS
  See application file for complete search history.

(56) References Cited

U.S. PATENT DOCUMENTS

| 2,365,958 | A | 12/1944 | Holslag |
| 2,416,047 | A | 2/1947 | Dolan |
| 2,976,462 | A | 3/1961 | Miller |
| 3,030,495 | A | 4/1962 | Anderson |
| 3,288,982 | A | 11/1966 | Haruyoshi |
| 3,549,857 | A | 12/1970 | Carter |
| 3,725,629 | A | 4/1973 | Vickers |
| 3,809,853 | A | 5/1974 | Manz |
| 3,849,871 | A | 11/1974 | Kaunitz |
| 3,912,980 | A | 10/1975 | Crump |

(Continued)

FOREIGN PATENT DOCUMENTS

| AT | 413801 | 6/2006 |
| CA | 2072711 | 12/1992 |

(Continued)

OTHER PUBLICATIONS

Machine translation of Japan Patent No. 01-071,575, Jan. 2023.*

(Continued)

*Primary Examiner* — Geoffrey S Evans
(74) *Attorney, Agent, or Firm* — McAndrews, Held & Malloy, Ltd.

(57) ABSTRACT

An example contact tip for a welding torch includes: a first body section having a first diameter and exterior threads, the first body section having channels extending longitudinally along an exterior surface of the first body section to permit gas flow from a first end of the contact tip to a second end of the contact tip through the channels; a first bore portion having a first inner diameter; and a second bore portion having a second inner diameter configured to contact an electrode wire traveling through the second bore portion, the first inner diameter being larger than the second inner diameter.

17 Claims, 7 Drawing Sheets

(56) References Cited

U.S. PATENT DOCUMENTS

| | | | |
|---|---|---|---|
| 3,946,349 A | 3/1976 | Haldeman | |
| 4,160,967 A | 7/1979 | Beech | |
| 4,188,419 A | 2/1980 | Detert | |
| 4,222,023 A | 9/1980 | Beech | |
| 4,329,561 A | 5/1982 | Schafer | |
| 4,384,187 A | 5/1983 | Jackson | |
| 4,426,565 A | 1/1984 | Rueter | |
| 4,447,703 A | 5/1984 | Stol | |
| 4,467,176 A | 8/1984 | Mizuno | |
| 4,493,971 A | 1/1985 | Nawa | |
| 4,531,040 A | 7/1985 | Nawa | |
| 4,536,634 A | 8/1985 | Nawa | |
| 4,546,234 A | 10/1985 | Ogasawara | |
| 4,547,654 A * | 10/1985 | Stol | B23K 9/10 |
| | | | 219/136 |
| 4,580,026 A * | 4/1986 | Stol | B23K 9/1093 |
| | | | 219/136 |
| 4,590,358 A | 5/1986 | Stol | |
| 4,614,856 A | 9/1986 | Hori | |
| 4,628,182 A | 12/1986 | Hori | |
| 4,631,385 A | 12/1986 | Rothermel | |
| 4,667,083 A | 5/1987 | Stol | |
| 4,675,494 A | 6/1987 | Dilay | |
| 4,728,761 A | 3/1988 | Mucha | |
| 4,897,523 A | 1/1990 | Parks | |
| 4,950,348 A | 8/1990 | Larsen | |
| 4,954,691 A | 9/1990 | Parks | |
| 4,973,821 A | 11/1990 | Martin | |
| 5,001,326 A | 3/1991 | Stava | |
| 5,043,557 A | 8/1991 | Tabata | |
| 5,086,207 A | 2/1992 | Deam | |
| 5,101,086 A | 3/1992 | Dion | |
| 5,118,028 A | 6/1992 | Ogawa | |
| 5,140,123 A | 8/1992 | Mitani | |
| 5,148,001 A | 9/1992 | Stava | |
| 5,208,433 A | 5/1993 | Hellegouarc | |
| 5,270,516 A | 12/1993 | Hamamoto | |
| 5,278,390 A | 1/1994 | Blankenship | |
| 5,315,089 A | 5/1994 | Hughes | |
| 5,319,179 A | 6/1994 | Joecks | |
| 5,343,023 A | 8/1994 | Geissler | |
| 5,349,156 A | 9/1994 | Madigan | |
| 5,352,871 A | 10/1994 | Ross | |
| 5,367,138 A | 11/1994 | Moss | |
| 5,412,184 A | 5/1995 | McGaffigan | |
| 5,461,215 A | 10/1995 | Haldeman | |
| 5,466,916 A | 11/1995 | Iguchi | |
| 5,504,309 A | 4/1996 | Geissler | |
| 5,521,355 A | 5/1996 | Lorentzen | |
| 5,526,561 A | 6/1996 | McGaffigan | |
| 5,644,461 A | 7/1997 | Miller | |
| 5,710,413 A | 1/1998 | King | |
| 5,714,738 A | 2/1998 | Hauschulz | |
| 5,739,506 A | 4/1998 | Hanton | |
| 5,742,029 A | 4/1998 | Stava | |
| 5,756,967 A | 5/1998 | Quinn | |
| 5,760,373 A | 6/1998 | Colling | |
| 5,773,799 A | 6/1998 | Maxfield | |
| 5,783,799 A | 7/1998 | Geissler | |
| 5,844,193 A | 12/1998 | Nomura | |
| 5,963,022 A | 10/1999 | Buda | |
| 5,968,587 A | 10/1999 | Frankel | |
| 5,994,659 A | 11/1999 | Offer | |
| 6,002,104 A | 12/1999 | Hsu | |
| 6,008,470 A | 12/1999 | Zhang | |
| 6,043,471 A | 3/2000 | Wiseman | |
| 6,051,810 A | 4/2000 | Stava | |
| 6,077,369 A | 6/2000 | Kusano | |
| 6,078,023 A | 6/2000 | Jones | |
| 6,090,067 A | 7/2000 | Carter | |
| 6,107,602 A | 8/2000 | Geissler | |
| 6,115,273 A | 9/2000 | Geissler | |
| 6,160,241 A | 12/2000 | Stava | |
| 6,169,263 B1 | 1/2001 | Derby | |
| 6,204,476 B1 | 3/2001 | Reynolds | |
| 6,248,976 B1 | 6/2001 | Blankenship | |
| 6,259,059 B1 | 7/2001 | Hsu | |
| 6,265,688 B1 | 7/2001 | Lyshkow | |
| 6,274,845 B1 | 8/2001 | Stava | |
| 6,278,074 B1 | 8/2001 | Morlock | |
| 6,292,715 B1 | 9/2001 | Rongo | |
| 6,331,694 B1 | 12/2001 | Blankenship | |
| 6,359,258 B1 | 3/2002 | Blankenship | |
| 6,479,792 B1 | 11/2002 | Beiermann | |
| 6,486,439 B1 | 11/2002 | Spear et al. | |
| 6,515,259 B1 | 2/2003 | Hsu | |
| 6,559,416 B1 | 5/2003 | Steenis | |
| 6,583,386 B1 | 6/2003 | Ivkovich | |
| 6,596,970 B2 | 7/2003 | Blankenship | |
| 6,624,388 B1 | 9/2003 | Blankenship et al. | |
| 6,642,482 B2 | 11/2003 | Rappl | |
| 6,670,579 B2 | 12/2003 | Davidson et al. | |
| 6,707,001 B1 | 3/2004 | Ulrich | |
| 6,710,297 B1 | 3/2004 | Artelsmair | |
| 6,720,529 B2 | 4/2004 | Davidson | |
| 6,744,012 B2 | 6/2004 | Ueda | |
| 6,747,247 B2 | 6/2004 | Holverson | |
| 6,849,828 B2 | 2/2005 | Aigner | |
| 6,906,284 B2 | 6/2005 | Kim | |
| 6,909,067 B2 | 6/2005 | Davidson | |
| 6,933,466 B2 | 8/2005 | Hutchison | |
| 6,958,263 B2 | 10/2005 | Bhattacharyya | |
| 6,974,931 B2 | 12/2005 | Holverson | |
| 6,974,932 B2 | 12/2005 | Holverson | |
| 6,984,806 B2 | 1/2006 | Huismann | |
| 6,995,338 B2 | 2/2006 | Hutchison | |
| 7,002,103 B2 | 2/2006 | Holverson | |
| 7,105,775 B2 | 9/2006 | Giese | |
| 7,129,443 B2 | 10/2006 | Davidson | |
| 7,145,101 B2 | 12/2006 | Tong | |
| 7,244,905 B2 | 7/2007 | Das | |
| 7,265,320 B2 | 9/2007 | Ou | |
| 7,304,269 B2 | 12/2007 | Fulmer | |
| 7,307,240 B2 | 12/2007 | Holverson | |
| 7,351,933 B2 | 4/2008 | Huismann | |
| 7,381,923 B2 | 6/2008 | Gordon | |
| 7,576,300 B2 | 8/2009 | Giese | |
| 7,663,074 B2 | 2/2010 | Wells | |
| 7,683,290 B2 | 3/2010 | Daniel | |
| 8,203,100 B2 | 6/2012 | Ueda | |
| 8,288,686 B2 | 10/2012 | Kaufman | |
| 8,304,692 B2 | 11/2012 | Ohkubo | |
| 8,304,693 B2 | 11/2012 | Ma | |
| 8,357,877 B2 | 1/2013 | Ma | |
| 8,487,215 B2 | 7/2013 | Holverson | |
| 8,604,388 B2 | 12/2013 | Dingeldein | |
| 9,095,928 B2 | 8/2015 | Ash | |
| 9,162,312 B2 | 10/2015 | Ma | |
| 9,193,004 B2 | 11/2015 | Enyedy et al. | |
| 9,193,005 B2 | 11/2015 | Ma | |
| 9,233,432 B2 | 1/2016 | Zhang | |
| 9,403,231 B2 | 8/2016 | Hutchison | |
| 9,409,250 B2 | 8/2016 | Daniel | |
| 9,463,523 B2 | 10/2016 | Roth | |
| 9,539,662 B2 | 1/2017 | Hutchison | |
| 9,669,486 B2 | 6/2017 | Dingeldein | |
| 9,862,050 B2 | 1/2018 | Cole | |
| 9,925,613 B2 | 3/2018 | Rozmarynowski | |
| 9,950,383 B2 | 4/2018 | Davidson | |
| 10,406,621 B2 | 9/2019 | Salsich | |
| 10,675,699 B2 | 6/2020 | Hsu | |
| 10,843,288 B2 | 11/2020 | Salsich | |
| 10,994,362 B2 | 5/2021 | Raudsepp | |
| 11,007,597 B2 | 5/2021 | Salsich | |
| 2002/0008095 A1 | 1/2002 | Norrish | |
| 2002/0045970 A1 | 4/2002 | Krause | |
| 2002/0107825 A1 | 8/2002 | Manicke | |
| 2002/0117487 A1 | 8/2002 | Corby | |
| 2002/0117488 A1 | 8/2002 | Arndt | |
| 2003/0010756 A1 | 1/2003 | Enyedy | |
| 2003/0058149 A1 | 3/2003 | Jayadeva | |
| 2004/0010342 A1 | 1/2004 | Thelen | |
| 2004/0069759 A1 | 4/2004 | Davidson | |
| 2004/0182828 A1 | 9/2004 | Schmidt | |

(56) References Cited

U.S. PATENT DOCUMENTS

| | | |
|---|---|---|
| 2004/0222204 A1 | 11/2004 | Hutchison |
| 2004/0238511 A1 | 12/2004 | Matus |
| 2005/0072762 A1 | 4/2005 | Delgado |
| 2005/0184039 A1 | 8/2005 | Stava |
| 2005/0218132 A1 | 10/2005 | Wells |
| 2005/0269306 A1 | 12/2005 | Fulmer |
| 2006/0138115 A1 | 6/2006 | Norrish |
| 2006/0163227 A1 | 7/2006 | Hillen |
| 2006/0163229 A1 | 7/2006 | Hutchison |
| 2007/0051711 A1 | 3/2007 | Kachline |
| 2007/0084840 A1 | 4/2007 | Davidson |
| 2007/0102407 A1 | 5/2007 | Uezono |
| 2007/0170163 A1 | 7/2007 | Narayanan |
| 2007/0235434 A1 | 10/2007 | Davidson |
| 2007/0267394 A1 | 11/2007 | Beck |
| 2008/0053978 A1 | 3/2008 | Peters |
| 2008/0264916 A1 | 10/2008 | Nagano |
| 2008/0264917 A1 | 10/2008 | White |
| 2008/0264923 A1 | 10/2008 | White |
| 2009/0026188 A1 | 1/2009 | Schorghuber |
| 2009/0039066 A1 | 2/2009 | Centner |
| 2009/0173726 A1 | 7/2009 | Davidson et al. |
| 2009/0215302 A1 | 8/2009 | Roberts |
| 2010/0012637 A1 | 1/2010 | Jaegar |
| 2010/0059493 A1 | 3/2010 | McAninch |
| 2010/0096373 A1 | 4/2010 | Hillen |
| 2010/0096436 A1 | 4/2010 | Nangle |
| 2010/0133250 A1 | 6/2010 | Sardy |
| 2010/0176104 A1 | 7/2010 | Peters |
| 2010/0308026 A1 | 12/2010 | Vogel |
| 2010/0308027 A1 | 12/2010 | Vogel |
| 2010/0314371 A1 | 12/2010 | Davidson |
| 2011/0108527 A1 | 5/2011 | Peters |
| 2011/0114612 A1 | 5/2011 | Holverson |
| 2011/0163080 A1 | 7/2011 | Beck |
| 2011/0204034 A1 | 8/2011 | Schartner |
| 2011/0204035 A1 | 8/2011 | Grossauer |
| 2011/0297658 A1 | 8/2011 | Peters |
| 2011/0248007 A1 | 10/2011 | Takeda |
| 2011/0266269 A1 | 11/2011 | Kachline |
| 2012/0024828 A1 | 2/2012 | Oowaki |
| 2012/0061362 A1 | 3/2012 | Davidson |
| 2012/0074112 A1 | 3/2012 | Kotera |
| 2012/0097655 A1 | 4/2012 | Daniel |
| 2012/0248080 A1 | 10/2012 | Hutchison |
| 2012/0285932 A1 | 11/2012 | Yuan |
| 2012/0291172 A1 | 11/2012 | Wills |
| 2012/0298642 A1 | 11/2012 | Lambert |
| 2013/0112674 A1 | 5/2013 | Mnich |
| 2013/0112676 A1 | 5/2013 | Hutchison |
| 2013/0213942 A1 | 8/2013 | Peters |
| 2013/0264323 A1 | 10/2013 | Daniel |
| 2013/0270245 A1 | 10/2013 | Holverson |
| 2014/0008328 A1 | 1/2014 | Enyedy |
| 2014/0008331 A1 | 1/2014 | Ogborn |
| 2014/0008339 A1 | 1/2014 | Ogborn |
| 2014/0008343 A1 | 1/2014 | Ash |
| 2014/0008344 A1 | 1/2014 | Enyedy |
| 2014/0008354 A1 | 1/2014 | Pletcher |
| 2014/0021183 A1* | 1/2014 | Peters .................. B23K 9/173 219/130.51 |
| 2014/0021186 A1 | 1/2014 | Denney |
| 2014/0021187 A1 | 1/2014 | Denney |
| 2014/0021188 A1 | 1/2014 | Denney |
| 2014/0034621 A1 | 2/2014 | Daniel |
| 2014/0034622 A1 | 2/2014 | Barrett |
| 2014/0035279 A1 | 2/2014 | Narayanan |
| 2014/0042129 A1 | 2/2014 | Daniel |
| 2014/0042138 A1 | 2/2014 | Matthews |
| 2014/0048524 A1 | 2/2014 | Ash |
| 2014/0116994 A1 | 5/2014 | Peters |
| 2014/0131321 A1 | 5/2014 | Enyedy |
| 2014/0158669 A1 | 6/2014 | Davidson |
| 2014/0177109 A1 | 6/2014 | Curtis |
| 2014/0183176 A1 | 7/2014 | Hutchison |
| 2014/0217077 A1 | 8/2014 | Davidson |
| 2014/0251965 A1 | 9/2014 | Wiryadinata |
| 2014/0251971 A1 | 9/2014 | Hearn |
| 2014/0263193 A1 | 9/2014 | Denney |
| 2014/0263194 A1 | 9/2014 | Narayanan |
| 2014/0263228 A1 | 9/2014 | Peters |
| 2014/0263229 A1 | 9/2014 | Peters |
| 2014/0263230 A1* | 9/2014 | Peters .................. B23K 9/173 219/130.1 |
| 2014/0263231 A1 | 9/2014 | Peters |
| 2014/0263234 A1 | 9/2014 | Peters |
| 2014/0263237 A1 | 9/2014 | Daniel |
| 2014/0263241 A1 | 9/2014 | Henry |
| 2014/0263243 A1 | 9/2014 | Marschke |
| 2014/0263251 A1 | 9/2014 | Enyedy |
| 2014/0319103 A1 | 10/2014 | Stabb et al. |
| 2014/0367370 A1 | 12/2014 | Hutchison |
| 2014/0374391 A1 | 12/2014 | Cole |
| 2015/0001184 A1 | 1/2015 | Cole |
| 2015/0001197 A1 | 1/2015 | Marschke |
| 2015/0014283 A1 | 1/2015 | Peters |
| 2015/0028010 A1 | 1/2015 | Peters |
| 2015/0028011 A1 | 1/2015 | Peters |
| 2015/0028012 A1 | 1/2015 | Peters |
| 2015/0083702 A1 | 3/2015 | Scott |
| 2015/0090703 A1 | 4/2015 | Peters |
| 2015/0105898 A1 | 4/2015 | Adams |
| 2015/0151375 A1 | 6/2015 | Peters |
| 2015/0158105 A1 | 6/2015 | Peters |
| 2015/0158106 A1 | 6/2015 | Peters |
| 2015/0158107 A1 | 6/2015 | Latessa |
| 2015/0158108 A1 | 6/2015 | Peters |
| 2015/0183044 A1 | 7/2015 | Peters |
| 2015/0183045 A1 | 7/2015 | Peters |
| 2015/0209889 A1 | 7/2015 | Peters |
| 2015/0209905 A1 | 7/2015 | Matthews |
| 2015/0209906 A1 | 7/2015 | Denney et al. |
| 2015/0209907 A1 | 7/2015 | Narayanan |
| 2015/0209908 A1 | 7/2015 | Peters |
| 2015/0209910 A1 | 7/2015 | Denney |
| 2015/0209913 A1 | 7/2015 | Denney |
| 2015/0213921 A1 | 7/2015 | Koide |
| 2015/0251275 A1 | 9/2015 | Denney et al. |
| 2015/0273612 A1 | 10/2015 | Peters |
| 2015/0283638 A1 | 10/2015 | Henry |
| 2015/0283639 A1 | 10/2015 | Henry |
| 2016/0074954 A1 | 3/2016 | Marschke |
| 2016/0144444 A1 | 5/2016 | Davidson |
| 2016/0167151 A1 | 6/2016 | Mehn |
| 2016/0175975 A1 | 6/2016 | Lattner |
| 2016/0199939 A1 | 7/2016 | Hartman |
| 2016/0221105 A1 | 8/2016 | Henry |
| 2016/0288235 A1 | 10/2016 | Davidson |
| 2016/0318112 A1 | 11/2016 | Hutchison |
| 2017/0080512 A1 | 3/2017 | Centner |
| 2017/0165778 A1* | 6/2017 | Hsu .................. B23K 9/24 |
| 2017/0216953 A1 | 8/2017 | Salsich |
| 2017/0225255 A1 | 8/2017 | Zwayer |
| 2018/0236585 A1 | 8/2018 | Davidson |
| 2018/0333798 A1 | 11/2018 | Uecker |
| 2018/0354052 A1 | 12/2018 | Schartner |
| 2018/0354053 A1 | 12/2018 | Zwayer |
| 2018/0354057 A1 | 12/2018 | Sigl |
| 2019/0061039 A1 | 2/2019 | Doyle |

FOREIGN PATENT DOCUMENTS

| | | |
|---|---|---|
| CA | 2883947 | 3/2014 |
| CN | 1031342 | 3/1989 |
| CN | 2125475 | 12/1992 |
| CN | 2181354 | 11/1994 |
| CN | 1102480 | 5/1995 |
| CN | 2215372 | 12/1995 |
| CN | 1191790 | 9/1998 |
| CN | 1220626 | 6/1999 |
| CN | 1298778 | 6/2001 |
| CN | 1496774 | 5/2004 |
| CN | 1600486 | 3/2005 |
| CN | 1640603 | 7/2005 |

(56) References Cited

FOREIGN PATENT DOCUMENTS

| | | |
|---|---|---|
| CN | 1665633 | 9/2005 |
| CN | 1712168 | 12/2005 |
| CN | 1714978 | 1/2006 |
| CN | 1836818 | 9/2006 |
| CN | 1871093 | 11/2006 |
| CN | 101062530 | 10/2007 |
| CN | 201098775 | 8/2008 |
| CN | 101376191 | 3/2009 |
| CN | 101434017 | 5/2009 |
| CN | 201249331 | 6/2009 |
| CN | 101804495 | 8/2010 |
| CN | 101862886 | 10/2010 |
| CN | 102059476 | 5/2011 |
| CN | 102126077 | 7/2011 |
| CN | 102458749 | 5/2012 |
| CN | 102470473 | 5/2012 |
| CN | 102554418 | 7/2012 |
| CN | 102596475 | 7/2012 |
| CN | 102648069 A | 8/2012 |
| CN | 102649202 | 8/2012 |
| CN | 102770228 | 11/2012 |
| CN | 102825370 | 12/2012 |
| CN | 202639618 U | 1/2013 |
| CN | 202824943 | 3/2013 |
| CN | 103624378 | 3/2014 |
| CN | 104043895 A | 9/2014 |
| CN | 104093516 | 10/2014 |
| CN | 104115085 A | 10/2014 |
| CN | 104263897 | 1/2015 |
| CN | 104493368 A | 4/2015 |
| CN | 104508161 | 4/2015 |
| CN | 104511680 | 4/2015 |
| CN | 104968465 | 10/2015 |
| CN | 108472759 | 8/2018 |
| DE | 2228701 | 12/1972 |
| DE | 2501928 | 7/1976 |
| DE | 19808383 | 9/1999 |
| DE | 212004000048 | 6/2006 |
| EP | 0150543 | 8/1985 |
| EP | 0194045 | 9/1986 |
| EP | 0204559 | 12/1986 |
| EP | 0387223 | 9/1990 |
| EP | 0936019 A2 | 8/1999 |
| EP | 0936019 A3 | 3/2001 |
| EP | 1232825 | 8/2002 |
| EP | 2218537 | 8/2010 |
| EP | 2286949 | 2/2011 |
| EP | 2322315 | 5/2011 |
| EP | 2522453 | 11/2012 |
| EP | 2892680 | 7/2015 |
| EP | 2781291 | 10/2015 |
| FR | 1443701 | 6/1966 |
| JP | 56009074 A * | 1/1981 |
| JP | S5719166 | 2/1982 |
| JP | S57109573 | 7/1982 |
| JP | S583784 | 1/1983 |
| JP | S5874278 | 5/1983 |
| JP | S58110195 | 6/1983 |
| JP | S58119466 | 7/1983 |
| JP | S60108175 | 6/1985 |
| JP | S60108176 | 6/1985 |
| JP | S60170577 | 9/1985 |
| JP | 61186172 | 8/1986 |
| JP | S61186172 | 8/1986 |
| JP | S629773 | 1/1987 |
| JP | 01071575 A * | 3/1989 |
| JP | S6471575 | 3/1989 |
| JP | H03285768 | 12/1991 |
| JP | H06277840 | 10/1994 |
| JP | H07204848 | 8/1995 |
| JP | H1097327 | 4/1998 |
| JP | H11156542 | 6/1999 |
| JP | 2001276971 | 10/2001 |
| JP | 2003205385 | 7/2003 |
| JP | 2003311409 | 11/2003 |
| JP | 2005034853 | 2/2005 |
| JP | 2006205189 | 8/2006 |
| JP | 2009072814 | 4/2009 |
| JP | 4950819 | 6/2012 |
| JP | 2014176890 | 9/2014 |
| KR | 1020060133016 | 12/2006 |
| KR | 20080009816 | 1/2008 |
| KR | 20100120562 | 11/2010 |
| KR | 1020120027764 | 3/2012 |
| KR | 101497460 | 3/2015 |
| SU | 872102 | 10/1981 |
| WO | 9640465 | 12/1996 |
| WO | 0132347 | 5/2001 |
| WO | 0153030 | 7/2001 |
| WO | 2005030422 | 4/2005 |
| WO | WO-2010144688 A1 * | 12/2010 ............ B23K 9/123 |
| WO | 2014140783 | 9/2014 |
| WO | 2015076891 | 5/2015 |
| WO | 2015125008 | 8/2015 |

OTHER PUBLICATIONS

Int'l Search Report and Written Opinion AppIn No. PCT/U2019/067491 dated Jun. 25, 2020.

"ALT 304," Miller—The Power of Blue, Jun. 2001.

"Maxstar 200 SD, DX, and LX," Miller Electric Mfg. Co., Oct. 2003.

Bondy et al., "Graph Theory with Applications," Department of Combinatorics and Optimization, University of Waterloo, 1976, p. 7-8.

Canadian Office Action AppIn No. 3,005,408 dated Mar. 19, 2019.

Gupta, "A low temperature hydrogen sensor based on palladium nanoparticles," Published in 2014.

Int'l Search Report and Written Opinion for PCT/US2016/065265 dated Mar. 14, 2017 (16 pages).

Int'l Search Report and Written Opinion for PCT/US2018/029770 dated Sep. 12, 2018 (13 pgs.).

Int'l Search Report and Written Opinion for PCT/US2018/035087 dated Sep. 19, 2018 (15 pgs.).

Int'l Search Report and Written Opinion for PCT/US2018/036852 dated Oct. 2, 2018 (17 pgs.).

Int'l Search Report and Written Opinion for PCT/US2018/036898 dated Oct. 1, 2018 (14 pgs.).

Int'l Search Report and Written Opinion for PCT/US2018/036900 dated Oct. 5, 2018 (15 pgs.).

Int'l Search Report and Written Opinion for PCT/US2018/036906 dated Oct. 1, 2018 (15 pgs.).

Int'l Search Report and Written Opinion for PCT/US2018/036914 dated Oct. 2, 2018 (14 pgs.).

Int'l Search Report and Written Opinion for PCT/US2018/036915 dated Oct. 1, 2018 (15 pgs).

Int'l Search Report and Written Opinion for PCT/US2018/036919 dated Oct. 2, 2018 (13 pgs.).

Int'l Search Report and Written Opinion for PCT/US2018/049888 dated Feb. 1, 2019 (14 pgs.).

Int'l Search Report and Written Opinion for PCT/US2018/052384 dated Feb. 12, 2019 (12 pgs.).

International Search Report from PCT application No. PCT/US2014/017864, dated Aug. 22, 2014, 9 pgs.

International Search Report from PCT application No. PCT/US2014/041201, dated Nov. 4, 2014, 11 pg.

International Search Report from PCT application No. PCT/US2014/045872, dated Nov. 4, 2014, 10 pgs.

International Search Report from PCT Application No. PCT/US2014/055529, dated Mar. 6, 2015, 9 pgs.

International Search Report from PCT application No. PCT/US2015/045715, dated Jan. 7, 2016, 12 pgs.

International Search Report from PCT application No. PCT/US2015/055040, dated Feb. 3, 2016, 11 pgs.

International Search Report from PCT application No. PCT/US2015/056121, dated Apr. 4, 2016, 11 pgs.

International Search Report from PCT application No. PCT/US2016/017385, dated Jul. 19, 2016, 13 pgs.

(56) References Cited

OTHER PUBLICATIONS

International Search Report from PCT application No. PCT/US2013/073490 dated May 13, 2014, 10 pgs.
International Search Report from PCT application No. PCT/US2013/073863 dated May 2, 2014, 15 pgs.
International Search Report from PCT application No. PCT/US2013/077710 dated May 9, 2014, 12 pgs.
International Search Report from PCT application No. PCT/US2014/014241 dated May 9, 2014, 8 pgs.
Lincoln Electric, "Storing and Redrying Electrodes," Published in 2011.
N.A..: "Drahtgluhe", Aug. 23, 2016 (Aug. 23, 2016), XP055510057, Wikipedia, Retrieved from the Internet: URL:https://de.wikipedia.Org/w/index.php7title=Drahtgl%C3%BChe&oldid=157333005, [retrieved on Sep. 26, 2018], with machine translation, 2 pages.
Non-Final Office Action U.S. Appl. No. 15/498,249 dated Sep. 23, 2019 (43 pgs).
Office Action from U.S. Appl. No. 15/498,249 dated Apr. 20, 2018.
PCT International Search Report & Written Opinion of PCT/US2012/063783 dated Mar. 1, 2013, 12 pages.
Pitrun, "The effect of welding parameters on levels of diffusible hydrogen in weld metal deposited using gas shield rutile flux cored wires," Published in 2004.
Int'l Search Report and Written Opinion Appln No. PCT/US2019/050972, dated Nov. 14, 2019, (13 pgs).
Int'l Search Report and Written Opinion Appln No. PCT/U2019/049109 dated Dec. 2, 2019 (11 pgs).
Pct, Iprp, issued in connection with PCT/US2018/036898, dated Dec. 19, 2019, 7 pages.
Pct, Iprp, issued in connection with PCT/US2018/036900, dated Dec. 19, 2019, 7 pages.
Non-Final Office Action U.S. Appl. No. 15/343,992 dated Mar. 7, 2019 (18 pgs.).
1 Canadian Office Action Appln No. 3,119,550 dated Jul. 22, 2022.
European Office Action Appln No. 22199347.0 dated Feb. 20, 2023.
European Office Action Appln No. 19769649.5 dated Apr. 26, 2023.
European Exam Report Appln No. 18735142.4 dated Jun. 22, 2023.
European Exam Report Appln No. 19839586.5 dated Jul. 18, 2023.

\* cited by examiner

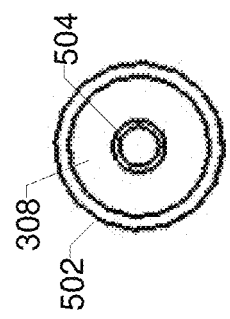
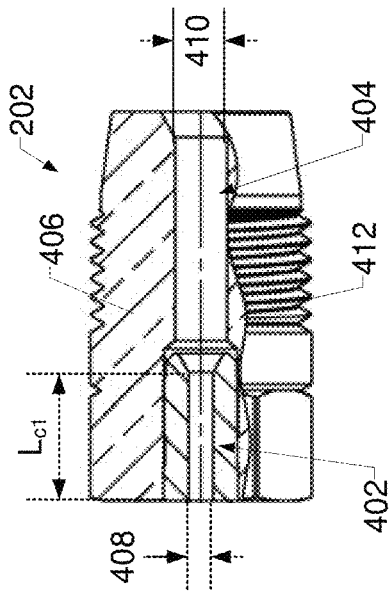
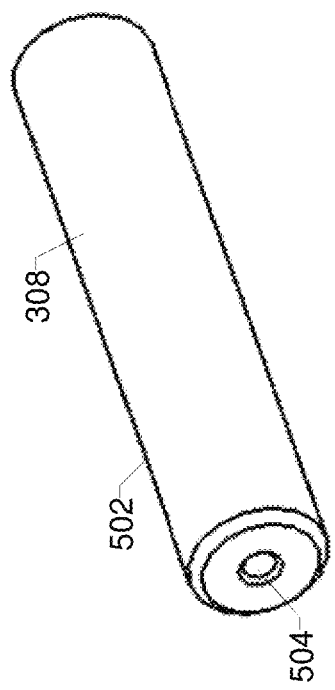
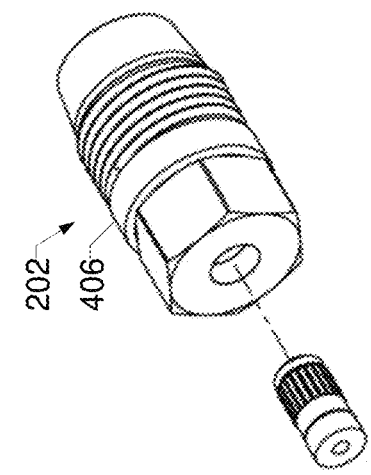
FIG. 4B
FIG. 5B
FIG. 4A
FIG. 5A

SYSTEMS, METHODS, AND APPARATUS TO PREHEAT WELDING WIRE

RELATED APPLICATIONS

This patent claims priority to U.S. Provisional Patent Application No. 62/782,027, filed Dec. 19, 2018, entitled "Systems, Methods, and Apparatus to Preheat Welding Wire." The entirety of U.S. Provisional Patent Application No. 62/782,027 is incorporated herein by reference.

BACKGROUND

This disclosure relates generally to welding and, more particularly, to welding torches and methods to provide wire preheating for welding.

Welding is a process that has increasingly become ubiquitous in all industries. Welding is, at its core, simply a way of bonding two pieces of metal. A wide range of welding systems and welding control regimes have been implemented for various purposes. In continuous welding operations, metal inert gas (MIG) welding and submerged arc welding (SAW) techniques allow for formation of a continuing weld bead by feeding welding wire shielded by inert gas from a welding torch and/or by flux. Such wire feeding systems are available for other welding systems, such as tungsten inert gas (TIG) welding. Electrical power is applied to the welding wire and a circuit is completed through the workpiece to sustain a welding arc that melts the electrode wire and the workpiece to form the desired weld.

While very effective in many applications, these welding techniques may experience different initial welding performance based upon whether the weld is started with the electrode "cold" or "hot." In general, a cold electrode start may be considered a start in which the electrode tip and adjacent metals are at or relatively near the ambient temperature. Hot electrode starts, by contrast, are typically those in which the electrode tip and the adjacent metals' temperature are much more elevated, but below the melting point of the electrode wire. In some applications, it is believed that initiation of welding arcs and welds is facilitated when the electrode is hot. However, the current state of the art does not provide regimes designed to ensure that the electrode is heated prior to initiation of a welding operation.

BRIEF DESCRIPTION OF THE DRAWINGS

FIGS. 4A and 4B show an example implementation of the first contact tip of FIGS. 2 and 3.

FIGS. 5A and 5B show an example implementation of the wire guide of FIG. 3.

The figures are not to scale. Where appropriate, the same or similar reference numerals are used in the figures to refer to similar or identical elements.

DETAILED DESCRIPTION

Figure 1:
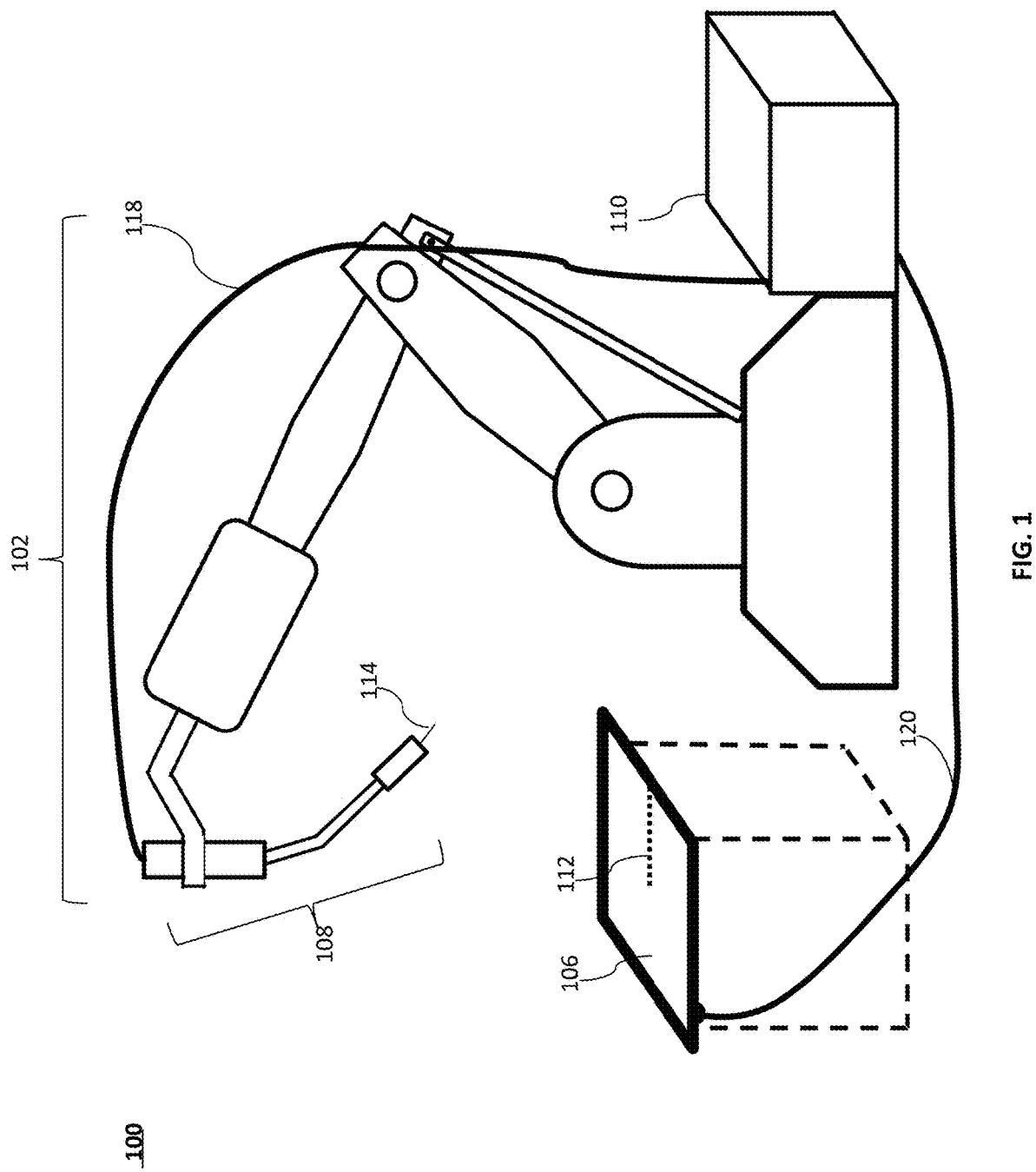
FIG. 1 illustrates an example robotic welding system in which a robot is used to weld a workpiece using a welding tool, in accordance with aspects of this disclosure.

For the purpose of promoting an understanding of the principles of this disclosure, reference will be now made to the examples illustrated in the drawings and specific language will be used to describe the same. It will nevertheless be understood that no limitation of the scope of the claims is intended by this disclosure. Modifications in the illustrated examples and such further applications of the principles of this disclosure as illustrated therein are contemplated as would typically occur to one skilled in the art to which this disclosure relates.

As used herein, the word "exemplary" means "serving as an example, instance, or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage, or mode of operation.

As utilized herein the terms "circuits" and "circuitry" refer to physical electronic components (i.e. hardware) and any software and/or firmware (code) that may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y." As another example, "x, y, and/or z" means any element of the seven-element set $\{(x), (y), (z), (x, y), (x, z), (y, z), (x, y, z)\}$. In other words, "x, y, and/or z" means "one or more of x, y and z". As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by an operator-configurable setting, factory trim, etc.).

As used herein, a wire-fed welding-type system refers to a system capable of performing welding (e.g., gas metal arc welding (GMAW), gas tungsten arc welding (GTAW), etc.), brazing, cladding, hardfacing, and/or other processes, in which a filler metal is provided by a wire that is fed to a work location, such as an arc or weld puddle.

As used herein, a welding-type power source refers to any device capable of, when power is applied thereto, supplying welding, cladding, plasma cutting, induction heating, laser (including laser welding and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

As used herein, preheating refers to heating the electrode wire prior to a welding arc and/or deposition in the travel path of the electrode wire.

Some disclosed examples describe electric currents being conducted "from" and/or "to" locations in circuits and/or power supplies. Similarly, some disclosed examples describe "providing" electric current via one or more paths, which may include one or more conductive or partially conductive elements. The terms "from," "to," and "providing," as used to describe conduction of electric current, do not necessitate the direction or polarity of the current. Instead, these electric currents may be conducted in either direction or have either polarity for a given circuit, even if an example current polarity or direction is provided or illustrated.

Disclosed example contact tips for welding torches include: a first body section having a first diameter and exterior threads, in which the first body section have channels extending longitudinally along an exterior surface of the first body section to permit gas flow from a first end of the contact tip to a second end of the contact tip through the channels; a first bore portion having a first inner diameter; and a second bore portion having a second inner diameter configured to contact an electrode wire traveling through the second bore portion, the first inner diameter being larger than the second inner diameter.

Some example contact tips further include a second body section that has a second diameter and is coaxial with the first body section, the second body section having a cross-section and the second diameter being smaller than the first diameter. In some examples, the second bore portion has a length greater than 0 inches and less than or equal to 2 inches. In some examples, the second bore portion has a length greater than 0 inches and less than or equal to 0.3 inches. In some example contact tips, the first inner diameter is configured to not contact the electrode wire traveling through the second bore portion. In some examples, the first body section includes exterior threads, the channels extend through the exterior threads, and the channels are transverse to the exterior threads.

Disclosed example wire preheating assemblies, include: a first electrical contact configured to contact an electrode wire over a first contact length of the first electrical contact; and a second electrical contact configured to contact the electrode wire over a second contact length of the second electrical contact; wherein a ratio of the first contact length to a distance between the first and second contact lengths is greater than 0 and less than or equal to 1.

In some example wire preheating assemblies, the first electrical contact has a first body length and the second electrical contact has a second body length, the first contact length being less than the first body length and the second contact length being less than the second body length.

In some examples, the first electrical contact comprises a first bore having a first inner diameter along the first contact length, and the second electrical contact includes a second bore having a second inner diameter along the second contact length. In some examples, the first electrical contact comprises a third bore and the second electrical contact includes a fourth bore, wherein the first bore and the second bore are aligned such that the electrode wire traveling through the wire preheating assembly does not contact the third bore or the fourth bore.

Some example wire preheating assemblies further include an electrically insulating spacer between the first and second contact tips. In some examples, the first electrical contact, the second electrical contact, and the spacer are rigidly coupled. In some examples, a ratio of the first contact length to a distance between the first and second contact lengths is greater than 0 and less than or equal to 0.15.

Disclosed example contact tip assemblies for a welding torch, the contact tip assembly includes: a first contact tip configured to contact an electrode wire over a first contact length of the first contact tip; and a second contact tip configured to contact the electrode wire over a second contact length of the second contact tip; wherein a ratio of the second contact length to the distance between the first and second contact lengths is greater than 0 and less than or equal to. In some examples, the ratio of the second contact length to a distance between the first and second contact lengths is greater than 0 and less than or equal to 0.15.

Disclosed example consumable electrode-fed welding-type systems include: a welding-type power source configured to provide welding-type current to a welding-type circuit, the welding-type circuit including a welding-type electrode and a first electrical contact configured to contact an electrode wire over a first contact length of the first electrical contact; an electrode preheating circuit configured to provide preheating current through a first portion of the welding-type electrode via a second electrical contact configured to contact the electrode wire over a second contact length of the second electrical contact; and electrode preheat control circuitry configured to control the electrode preheating circuit, wherein a ratio of the second contact length to the distance between the first and second contact lengths is greater than 0 and less than or equal to 1.

In some example welding-type systems, wherein the ratio of the second contact length to a distance between the first and second contact lengths is greater than 0 and less than or equal to 0.15. In some examples, the electrode preheat control circuitry is configured to control the electrode preheating circuit based on at least one of a target preheat voltage, a target preheat current, a target preheat enthalpy, a target preheat resistance, or a target wire temperature.

Disclosed example consumable electrode-fed welding-type systems include: a welding-type power source configured to provide welding-type current to a welding-type circuit, the welding-type circuit including a welding-type electrode and a first electrical contact configured to contact an electrode wire over a first contact length of the first electrical contact; an electrode preheating circuit configured to provide preheating current through a first portion of the welding-type electrode via a second electrical contact configured to contact the electrode wire over a second contact length of the second electrical contact; and electrode preheat control circuitry configured to control a preheating voltage of the electrode preheating circuit at least one of the welding-type current or the preheating current, wherein a ratio of the first contact length to the distance between the first and second contact lengths is between 0 and 1.

In some example welding-type systems, wherein the ratio of the second contact length to a distance between the first and second contact lengths is between 0 and 0.15. In some examples, the electrode preheat control circuitry is configured to control the preheating voltage based on at least one of the first contact length, the second contact length, or a total of the first and second contact lengths, and a distance between the first electrical contact and the second electrical contact. In some examples, a ratio of the second contact length of the second electrical contact to the distance between the first and second contact lengths is between 0 and 1. In some examples, the ratio of the second contact length to a distance between the first and second contact lengths is between 0 and 0.15.

Referring to FIG. 1, an example welding system 100 is shown in which a robot 102 is used to weld a workpiece 106 using a welding torch 108, such as the illustrated bent-neck (i.e., gooseneck design) welding torch (or, when under manual control, a handheld torch), to which power is delivered by welding equipment 110 via conduit 118 and returned by way of a ground conduit 120. The welding equipment 110 may comprise, inter alia, one or more power sources (each generally referred to herein as a "power supply"), a source of a shield gas, a wire feeder, and other devices. Other devices may include, for example, water coolers, fume extraction devices, one or more controllers, sensors, user interfaces, communication devices (wired and/or wireless), etc.

The welding system 100 of FIG. 1 may form a weld (e.g., at weld joint 112) between two components in a weldment by any known electric welding techniques. Known electric welding techniques include, inter alia, shielded metal arc welding (SMAW), MIG, flux-cored arc welding (FCAW), TIG, laser welding, sub-arc welding (SAW), stud welding, friction stir welding, and resistance welding. MIG, TIG, hot wire cladding, hot wire TIG, hot wire brazing, multiple arc applications, and SAW welding techniques, inter alia, may involve automated or semi-automated external metal filler (e.g., via a wire feeder). In multiple arc applications (e.g., open arc or sub-arc), the preheater may pre-heat the wire into a pool with an arc between the wire and the pool. The welding equipment 110 may be arc welding equipment having one or more power supplies, and associated circuitry, that provides a direct current (DC), alternating current (AC), or a combination thereof to an electrode wire 114 of a welding tool (e.g., welding torch 108). The welding torch 108 may be, for example, a TIG torch, a MIG torch, or a flux cored torch (commonly called a MIG "gun"). The electrode wire 114 may be tubular-type electrode, a solid type wire, a flux-core wire, a seamless metal core wire, and/or any other type of electrode wire.

As will be discussed below, the welding torch 108 employs a contact tip assembly that heats the electrode wire 114 prior to forming a welding arc using the electrode wire 114. Suitable electrode wire 114 types include, for example, tubular wire, metal cored wire, aluminum wire, solid gas metal arc welding (GMAW) wire, composite GMAW wire, gas-shielded FCAW wire, SAW wire, self-shielded wire, etc.

In the welding system 100, the robot 102, which is operatively coupled to welding equipment 110 via conduit 118 and ground conduit 120, controls the location of the welding torch 108 and operation of the electrode wire 114 (e.g., via a wire feeder) by manipulating the welding torch 108 and triggering the starting and stopping of the current flow (whether a preheat current and/or welding current) to the electrode wire 114 by sending, for example, a trigger signal to the welding equipment 110. When welding current is flowing, a welding arc is developed between the electrode wire 114 and the workpiece 106, which ultimately produces a weldment. The conduit 118 and the electrode wire 114 thus deliver welding current and voltage sufficient to create the electric welding arc between the electrode wire 114 and the workpiece 106. At the point of welding between the electrode wire 114 and the workpiece 106, the welding arc locally melts the workpiece 106 and electrode wire 114 supplied to the weld joint 112, thereby forming a weld joint 112 when the metal cools.

In certain aspects, in lieu of a robot 102's robotic arm, a human operator may control the location and operation of the electrode wire 114. For example, an operator wearing welding headwear and welding a workpiece 106 using a handheld torch to which power is delivered by welding equipment 110 via conduit 118. In operation, as with the system 100 of FIG. 1, an electrode wire 114 delivers the current to the point of welding on the workpiece 106 (e.g., a weldment). The operator, however, could control the location and operation of the electrode wire 114 by manipulating the handheld torch and triggering the starting and stopping of the current flow via, for example, a trigger. A handheld torch generally comprises a handle, a trigger, a conductor tube, a nozzle at the distal end of the conductor tube, and a contact tip assembly. Applying pressure to the trigger (i.e., actuating the trigger) initiates the welding process by sending a trigger signal to the welding equipment 110, whereby welding current is provided, and the wire feeder is activated as needed (e.g., to drive the electrode wire 114 forward to feed the electrode wire 114 and in reverse to retract the electrode wire 114). Commonly owned U.S. Pat. No. 6,858,818 to Craig S. Knoener, for example, describes an example system and method of controlling a wire feeder of a welding-type system.

Figure 2:
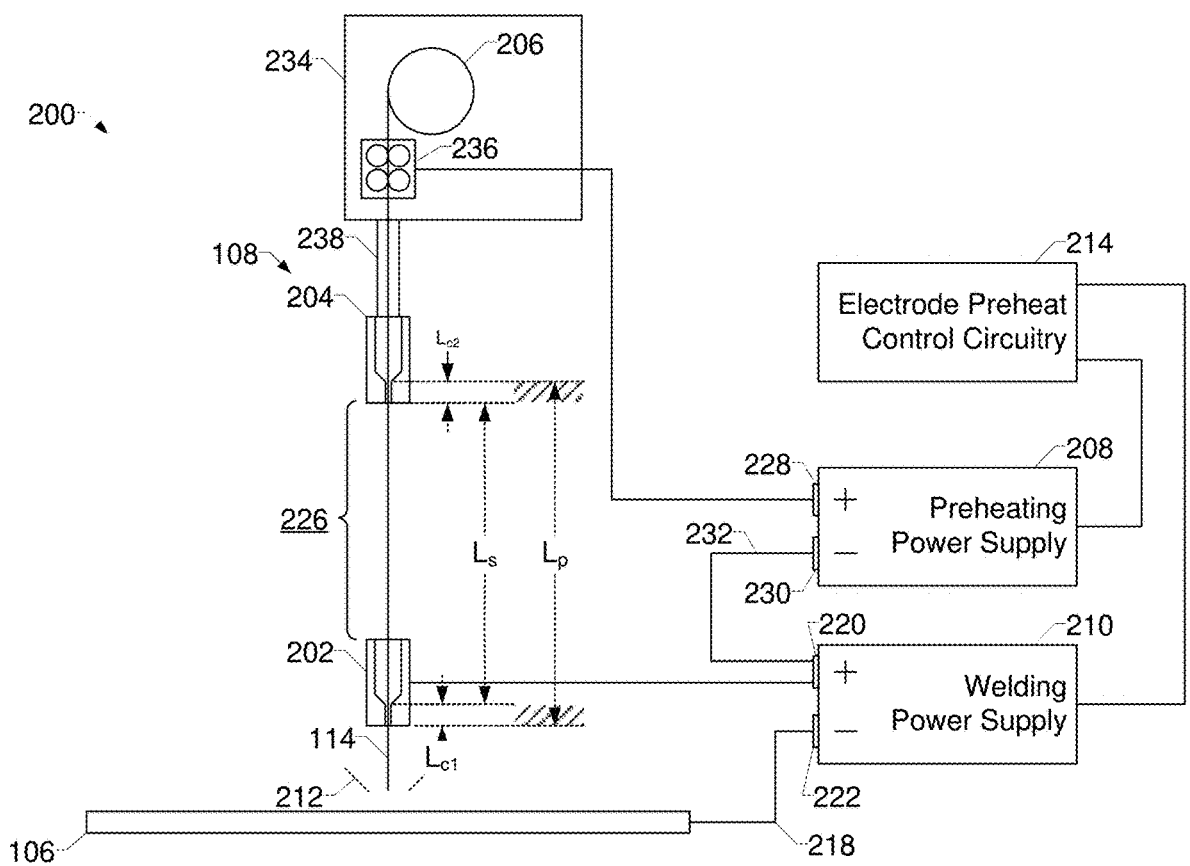
FIG. 2 illustrates a functional diagram of an example welding system, in accordance with aspects of this disclosure.

FIG. 2 illustrates a functional diagram of an example welding system 200 that may be used to implement the welding system 100 of FIG. 1. The welding system 200 includes the weld torch 108 having a first contact tip 202 and a second contact tip 204. The system 200 further includes the electrode wire 114 fed from a wire spool 206, a preheating power supply 208, and a welding power supply 210. The system 200 is illustrated in operation as producing a welding arc 212 between the electrode wire 114 and a workpiece 106.

The example system 200 further includes electrode preheat control circuitry 214. The electrode preheat control circuitry 214 controls a preheating voltage of the electrode preheating circuit, such as by controlling the preheating power supply 208. In some examples, the electrode preheat control circuitry 214 controls the welding power supply 210 based on one or more preheat parameters and/or inputs. For example, the electrode preheat control circuitry 214 may control the preheating voltage (e.g., the output voltage of the preheating power supply 208) based on the contact length $L_{c1}$, the second contact length $L_{c2}$, and/or a total of the first and second contact lengths, and based on a distance between the contact tip 202 and the contact tip 204 (e.g., a separate length $L_s$). Additionally or alternatively, the electrode preheat control circuitry 214 is configured to control the electrode preheating circuit based on at least one of a target preheat voltage, a target preheat current, a target preheat enthalpy, a target preheat resistance, a target wire temperature, and/or any other preheating and/or welding parameters and/or variables.

The example electrode preheat control circuitry 214 may be implemented using one or more processing and/or control circuits, memory, storage devices, communications circuits, and/or input/output circuitry and/or devices, including any combination of software, firmware, and/or hardware.

In operation, the electrode wire 114 passes from the wire spool 206 through the second contact tip 204 and the first contact tip 202, between which the preheating power supply 208 generates a preheating current to heat the electrode wire 114. Specifically, in the configuration shown in FIG. 2, the preheating current enters the electrode wire 114 via the second contact tip 204 and exits via the first contact tip 202. At the first contact tip 202, a welding current may also enter the electrode wire 114. The welding current is generated, or otherwise provided by, the welding power supply 210. The welding current exits the electrode wire 114 via the workpiece 106, which in turn generates the welding arc 212. When the electrode wire 114 makes contact with a target metal workpiece 106, an electrical circuit is completed and the welding current flows through the electrode wire 114, across the metal work piece(s) 106, and returns to the welding power supply 210. The welding current causes the electrode wire 114 and the parent metal of the work piece(s) 106 in contact with the electrode wire 114 to melt, thereby joining the work pieces as the melt solidifies. By preheating the electrode wire 114, a welding arc 212 may be generated with drastically reduced arc energy. Generally speaking, the preheating current is inversely proportional to the distance between the contact tips 202, 204 and proportional to the electrode wire 114 size.

The welding current is generated, or otherwise provided by, a welding power supply 210, while the preheating current is generated, or otherwise provided by, the preheating power supply 208. The preheating power supply 208 and the welding power supply 210 may ultimately share a common power source (e.g., a common generator or line current connection), but the current from the common power source is converted, inverted, and/or regulated to yield the two separate currents—the preheating current and the welding current. For instance, the preheat operation may be facilitated with a single power source and associated converter circuitry, in which case three leads may extend from a single power source.

During operation, the system 200 establishes a welding circuit to conduct welding current from the welding power supply 210 to the first contact tip 202, and returns to the power supply 210 via the welding arc 212, the workpiece 106, and a work lead 218. To enable connection between the welding power supply 210 and the first contact tip 202 and the workpiece 106, the welding power supply 210 includes terminals 220, 222 (e.g., a positive terminal and a negative terminal).

During operation, the preheating power supply establishes a preheating circuit to conduct preheating current through a section 226 of the electrode wire 114. To enable connection between the preheating power supply 208 and the contact tips 202, 204, the preheating power supply 208 includes terminals 228, 230. The preheating current flows from the welding power supply 210 to the second contact tip 204, the section 226 of the electrode wire 114, the first contact tip 202, and returns to the preheating power supply 208 via a cable 232 connecting the terminal 220 of the welding power supply 210 to the terminal 230 of the preheating power supply 208.

Because the preheating current path is superimposed with the welding current path over the connection between the first contact tip 202 and the power supplies 208, 210, the cable 232 may enable a more cost-effective single connection between the first contact tip 202 and the power supplies 208, 210 (e.g., a single cable) than providing separate connections for the welding current to the first contact tip 202 and for the preheating current to the first contact tip 202. In other examples, the terminal 230 of the preheating power supply 208 is connected to the first contact tip 202 via a separate path than the path between the first contact tip 202 and the welding power supply 210.

As illustrated in FIG. 2, the example system 100 includes a wire feeder 234 that feeds the electrode wire 114 to the torch 108 using a wire drive 236. The electrode wire 114 exits the wire feeder 234 and travels through a wire liner 238.

The example contact tips 202, 204 of FIG. 2 each have a contact length (e.g., $L_{c1}$, $L_{c2}$), along which the electrode wire 114 makes electrical contact with the contact tips 202, 204 to transfer current. The example contact tips 202, 204 may be constructed so that contact between the electrode wire 114 and portions of the contact tips 202, 204, other than the contact lengths, is highly unlikely during operation of the system 100. In some examples, an insulating material may be added to prevent contact with the contact tips 202, 204 other than along the contact lengths. The contact lengths determine the upper and lower limits on the length of the section 226 of the electrode wire 114 being heated. For instance, if the contact length of the first contact tip 202 is 1 millimeter (mm), the contact length of the second contact tip 204 is 1 mm, and the shortest distance between the contact lengths is 10 mm (e.g., "separation length," or $L_s$), the length of the section 226 (referred to as the "preheat length" and denoted $L_p$) may vary between 10 mm and 12 mm.

In a voltage-controlled preheating control scheme, the variation in the preheat length $L_p$ of the electrode wire 114 that is being preheated (which is effectively a variation in preheating resistance caused by the electrode wire 114) can result in a corresponding variation in preheating current and, thus, in heat input to the electrode wire 114 during preheating. Changes in wire temperature (from inconsistent preheating) cause changes in the temperature and resistance of the electrode wire 114 that is located at the arc 212 at any given time. The changes in the resistance of the electrode wire 114 affect the weld current in the arc 212 and/or the arc voltage. As the weld current and/or arc voltage change, the welding power supply 210 attempts to control the welding current and/or welding voltage via a voltage-controlled or current-controlled control loop, which results in further instability. Therefore, rapid variations in preheating caused by changing preheat lengths can cause instability in the arc 212 and/or inconsistent weld results.

Conventional welding contact tips have contact lengths that, when present in multiple contact tips, result in substantial inconsistency for the reasons described above. To improve the consistency of preheating, in the example of FIG. 2, the contact length of the contact tip 202, the contact length of the contact tip 204, and/or the sum of the contact lengths of the contact tips 202, 204 are based on a distance between the first and second contact lengths of the contact tips 202, 204 (e.g., the length of the section 226), and/or a preheat voltage drop (e.g., a voltage drop $V_p$ between the contact lengths $L_{c1}$, $L_{c2}$, a voltage drop across the section 226). The contact lengths of the contact tips 202, 204 may be selected based on an upper limit of a preheat voltage range, a lower limit of a preheat voltage range, an upper limit of a measured preheat voltage drop across the section 226 of the electrode wire 114, and/or a lower limit of the measured preheat voltage drop.

For example, one or more of the following ratios may be used to determine the contact lengths $L_{c1}$, $L_{c2}$, the separation length $L_s$, and/or the preheat voltage drop $V_p$):

the ratio of the contact length $L_{c1}$ of the first contact tip 202 to the maximum preheat length $L_p$ is between 0 and 1 or, more particularly, between 0 and 0.15;

the ratio of the contact length $L_{c2}$ of the second contact tip 204 to the maximum preheat length $L_p$ is between 0 and 1 or, more particularly, between 0 and 0.15; and/or the ratio of a total contact length, or the sum of the contact lengths $L_{c1}+L_{c2}$, of the contact tips 202, 204 to the maximum preheat length $L_p$ is between 0 and 2 or, more particularly, between 0 and 0.3.

In some examples, one or more of the following factors may be used to calculate preheating voltages with respect to wire diameters, wire types, and/or wire feed speeds:

the ratio of the contact length $L_{c1}$ of the first contact tip 202 to the preheat voltage drop $V_p$;

the ratio of the contact length $L_{c2}$ of the second contact tip 204 to the preheat voltage drop $V_p$; and/or the ratio of a total contact length (e.g., $L_{c1}$, $L_{c2}$, $L_{c1}+L_{c2}$), or the sum of the contact lengths $L_{c1}+L_{c2}$, of the second contact tip 204 to the preheat voltage drop $V_p$.

The ratios of contact length to maximum preheat length are readily convertible to ratios of contact length to minimum preheat length and/or ratios of contact length to separation length $L_s$.

The example contact lengths $L_{c1}$, $L_{c2}$ may be controlled or configured by swapping the contact tips 202, 204 with other contact tips having contact lengths in accordance with one or more of the ratios discussed above. The example preheat power supply 208 may control the voltage drop $V_p$ based on measuring voltage feedback (e.g., a voltage between the contact tips 202, 204) and controlling an output voltage to maintain the voltage drop $V_p$ based on one or more of the ratios discussed above.

While the examples discussed above refer to first and second contact tips in a welding torch, one or both of the first contact tip 202 and the second contact tip 204 may be replaced with other types of electrical contacts. For example, one or both contact tips 202, 204 may be replaced with conductive rollers that make substantially consistent contact with the electrode wire.

Additionally or alternatively, the contact tips 202, 204 (and/or other electrical contact(s)) may be positioned at a welding torch and/or at locations external to the welding torch. For example, the first contact tip 202 (or other electrical contact) may be positioned at the welding torch while the second contact tip 204 (or other electrical contact) may be positioned within the wire feeder, as part of an idle roller in a wire feeding system, and/or at any other location between the wire spool 206 and the first contact tip 202.

Figure 3:
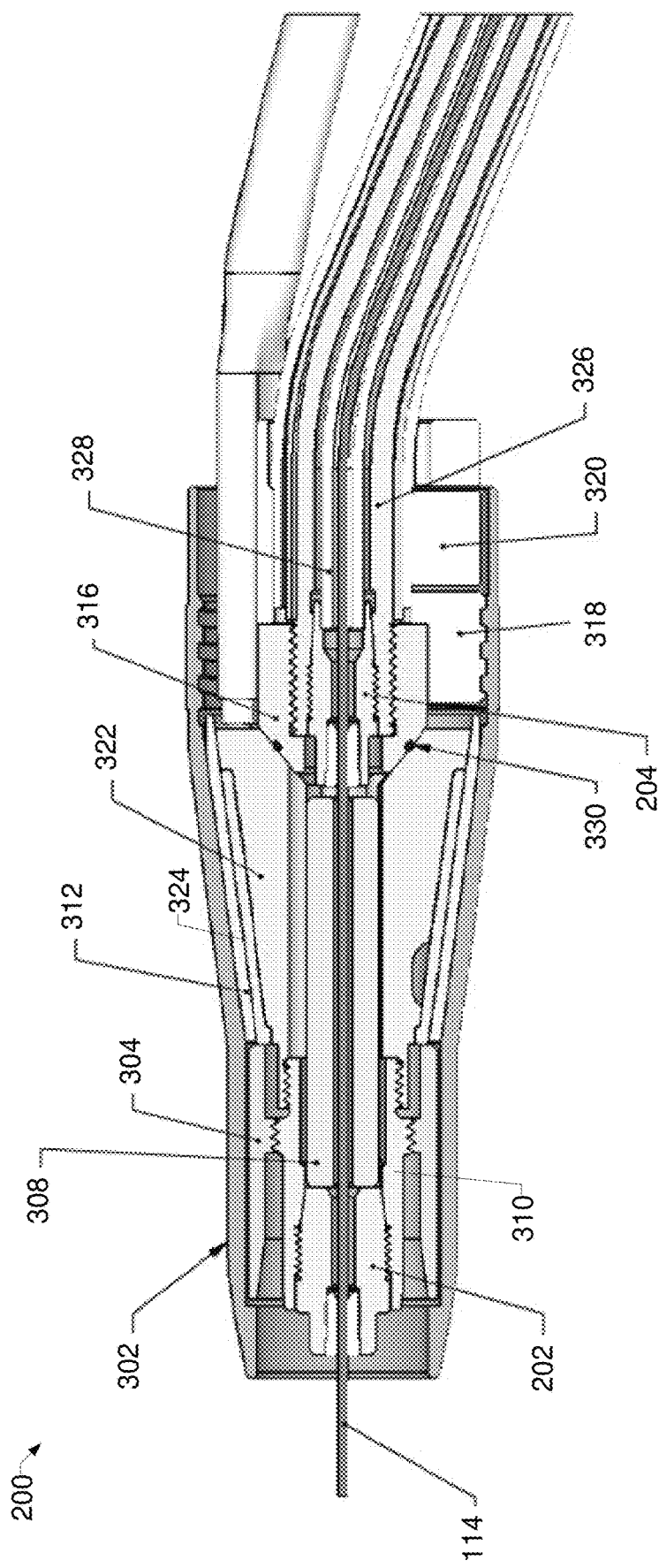
FIG. 3 is a cross-section view of an example nozzle assembly that may be used to implement the torch and the contact tips of FIGS. 1 and 2.

FIG. 3 is a cross-section view of an example nozzle assembly 300 that may be used to implement the torch 108 and the contact tips 202, 204 of FIGS. 1 and 2. The example nozzle assembly 300 includes a nozzle 302, a diffuser insulator 304, the first contact tip 202, a wire guide 308, a gas diffuser 310, a first contact tip insulator 312, the second contact tip 204, a second contact tip insulator 316, a nozzle mount 318, a nozzle mount clamp 320, a cooling body 322, and a cooling body cover 324. The nozzle assembly 300 is attached to a torch neck 326, through which a wire liner 328 conveys the electrode wire 114 and/or shielding gas to the nozzle assembly 300. In the example of FIG. 3, the contact tip 204 receives at least a portion of the wire liner 328 in a bore portion and in electrical contact with the contact tip 204.

The first contact tip 202 delivers welding current to the electrode wire 114 for arc welding. The first contact tip 202 is threaded into a gas diffuser 310, which is in turn threaded into the diffuser insulator 304. The diffuser insulator 304 provides electrical and thermal insulation between the gas diffuser 310 and the nozzle 302.

The gas diffuser 310 is threaded into the cooling body 322. The cooling body 322 conducts welding current and/or preheating current from a weld cable or other conductor of welding and/or preheating current to the diffuser 310, which is electrically connected to the first contact tip 202. The first contact tip insulator 312 and the diffuser insulator 304 provide electrical insulation between the weld current and preheat current path(s) and the nozzle 302.

The second contact tip 204 is electrically coupled to the torch neck 326 to conduct preheating current to and/or from the electrode wire 114. The preheating circuit includes the torch neck 326, the second contact tip 204, the first contact tip 202, a portion of the electrode wire 114 between the second contact tip 204 and the first contact tip 202 (e.g., the section 226 of FIG. 2), the diffuser 310, and the cooling body 322.

The second contact tip insulator 316 provides electrical insulation between the second contact tip 204 and the cooling body 322. The second contact tip insulator 316 includes a seal 330 (e.g., an o-ring) to reduce or prevent welding gas leakage. The nozzle mount 318 and the nozzle mount clamp 320 provide an attachment point for threading the nozzle assembly 300 onto the torch neck 326.

Figure 6B:
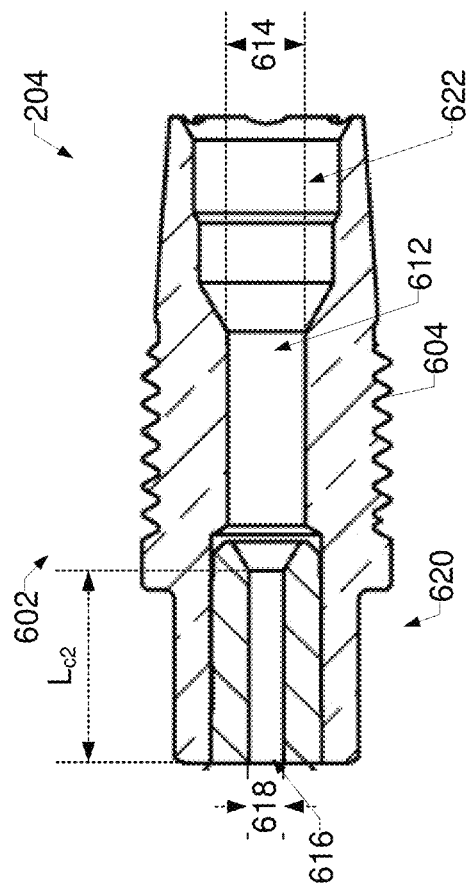
FIGS. 6A and 6B show an example implementation of the second contact tip of FIGS. 2 and 3.
Figure 6A:
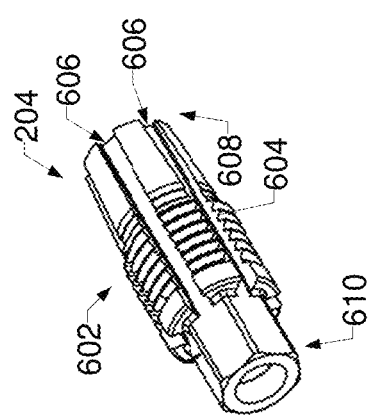

In the example of FIG. 3, the first contact tip 202, the wire guide 308, and/or the second contact tip 204 are removable via the tip of the nozzle 302. FIGS. 4A and 4B show an example implementation of the first contact tip 202, FIGS. 5A and 5B show an example implementation of the wire guide 308. FIGS. 6A and 6B show an example implementation of the second contact tip 204.

As shown in FIGS. 3 and 4A, the contact tip 202 includes a first bore portion 402 and a second bore portion 404 in a body 406 of the contact tip 202. The example first bore portion 402 has the contact length $L_{c1}$ and a first inner diameter 408 that enables the electrode wire 114 to make consistent electrical contact with the first bore portion 402. The second bore portion 404 has a second inner diameter 410, which is sufficiently large that the electrode wire 114 does not contact the second bore portion 404. Thus, contact between the electrode wire 114 and the contact tip 202 is limited to the contact length $L_{c1}$. The contact tip 202 may have more bore portion(s) than in this example, which also have inner diameters that do not result in contact between the bore portion(s) and the electrode wire 114.

The first bore portion 402 may be constructed by boring into the body 406 with a first inner diameter 408. Alternatively, the first bore portion 402 may be constructed by pressing an insert having the first inner diameter 408 into a larger bore of the body 406.

The example contact tip 202 may have one or more exterior features that ensure electrical contact with the diffuser 310 (e.g., to conduct preheat and/or welding current via the contact tip 202). For example, the body 406 may contain exterior threads 412 to enable the first contact tip 202 to be secured into the diffuser 310.

As shown in FIGS. 3, 5A, and 5B, an outer surface 502 of the wire guide 308 is relatively smooth (e.g., not threaded) and can be inserted into and removed from the nozzle assembly 300 without threading. The wire guide 308 has a wire path 504 to guide the electrode wire 114 from the second contact tip 204 to the first contact tip 202. In some examples, the wire guide 308 is a nonconductive material such as ceramic or a plastic having a high thermal tolerance to withstand heat from the preheating of the electrode wire 114 occurring within the wire guide 308. The electrode wire 114 is the only conductive path between the second contact tip 204 and the first contact tip 202.

As shown in FIGS. 6A and 6B, the second contact tip 204 includes a first body section 602 having a first diameter and exterior threads 604. The exterior threads 604 include gas flow channels 606 extending transverse to the exterior threads 604. The gas flow channels 606 permit gas flow from a first end 608 of the contact tip 204 to a second end 610 of the contact tip 204 through the exterior threads 604, while the contact tip 204 is installed in the torch 108 via the exterior threads 604.

The example contact tip 204 includes a first bore portion 612, having a first inner diameter 614, and a second bore portion 616 having a second inner diameter 618. The second inner diameter 618 has the contact length $L_{c2}$, and is configured to contact the electrode wire 114 traveling through the second bore portion 616. The first inner diameter 614 is sufficiently large that the electrode wire 114 does not contact the first bore portion 612.

The example contact tip 204 further includes a second body section 620 that has a second diameter and is coaxial with the first body section 602. The second body section 620 may have a feature, such as a hexagonal cross-section, that enables turning of the contact tip 204, such as to secure the second contact tip 204 within the torch 108.

Similar to the first bore portion 402 of the contact tip 202, the second bore portion 616 may be constructed by boring into a body (e.g., the first body section 602 and/or the second body section 620) of the contact tip 204 with the second inner diameter 618. Alternatively, the second bore portion 616 may be constructed by pressing an insert having the second inner diameter 618 into a larger bore of the body of the contact tip 204.

In the example of FIGS. 3, 5A, and 5B, the wire guide 308 aligns the electrode wire 114 with the first bore portion 402 of the contact tip 202 and the second bore to prevent the electrode wire 114 from contacting other portions of the contact tip 202. As illustrated in FIGS. 3 and 6B, a third bore portion 622 is configured to receive at least a portion of the wire liner 328.

Figure 7:
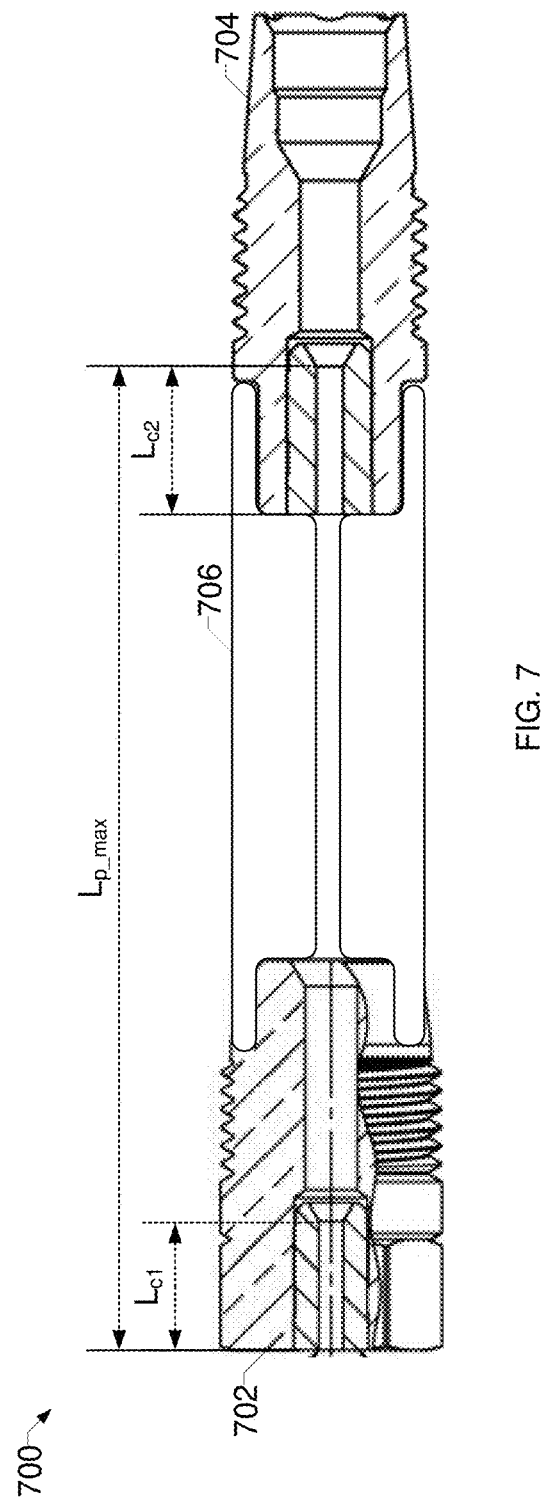
FIG. 7 illustrates an example contact tip assembly having contact lengths described by ratios, in accordance with aspects of this disclosure.

FIG. 7 illustrates an example contact tip assembly 700 having contact lengths in accordance with the ratios described above. The example contact tip assembly 700 includes a first contact tip 702, a second contact tip 704, and an electrically insulating spacer 706. The first contact tip 702, the second contact tip 704, and the spacer 706 are mechanically coupled so as to be installed as a single unit. The example contact tip assembly 700 may be used in the torch 108 of FIG. 2 in place of the contact tips 202, 204 and the wire guide 308.

The example first contact tip 702 contacts the electrode wire 114 over a first contact length $L_{c1}$ and the second contact tip 704 contacts the electrode wire 114 over a second contact length $L_{c2}$. The example first contact tip 702 delivers welding current and/or preheating current to and/or from the electrode wire 114. The second contact tip 704 delivers preheating current to and/or from the electrode wire 114.

In the example of FIG. 7, the ratio of the contact length $L_{c1}$ of the first contact tip 702 to the maximum preheat length $L_{p\_max}$ is between A and B, the ratio of the contact length $L_{c2}$ of the second contact tip 704 to the maximum preheat length $L_{p\_max}$ is between A and B, and/or the ratio of a total contact length (e.g., the sum of the contact lengths $L_{c1}+L_{c2}$) of the second contact tip 204 to the preheat length $L_p$ is between C and D.

Figure 8:
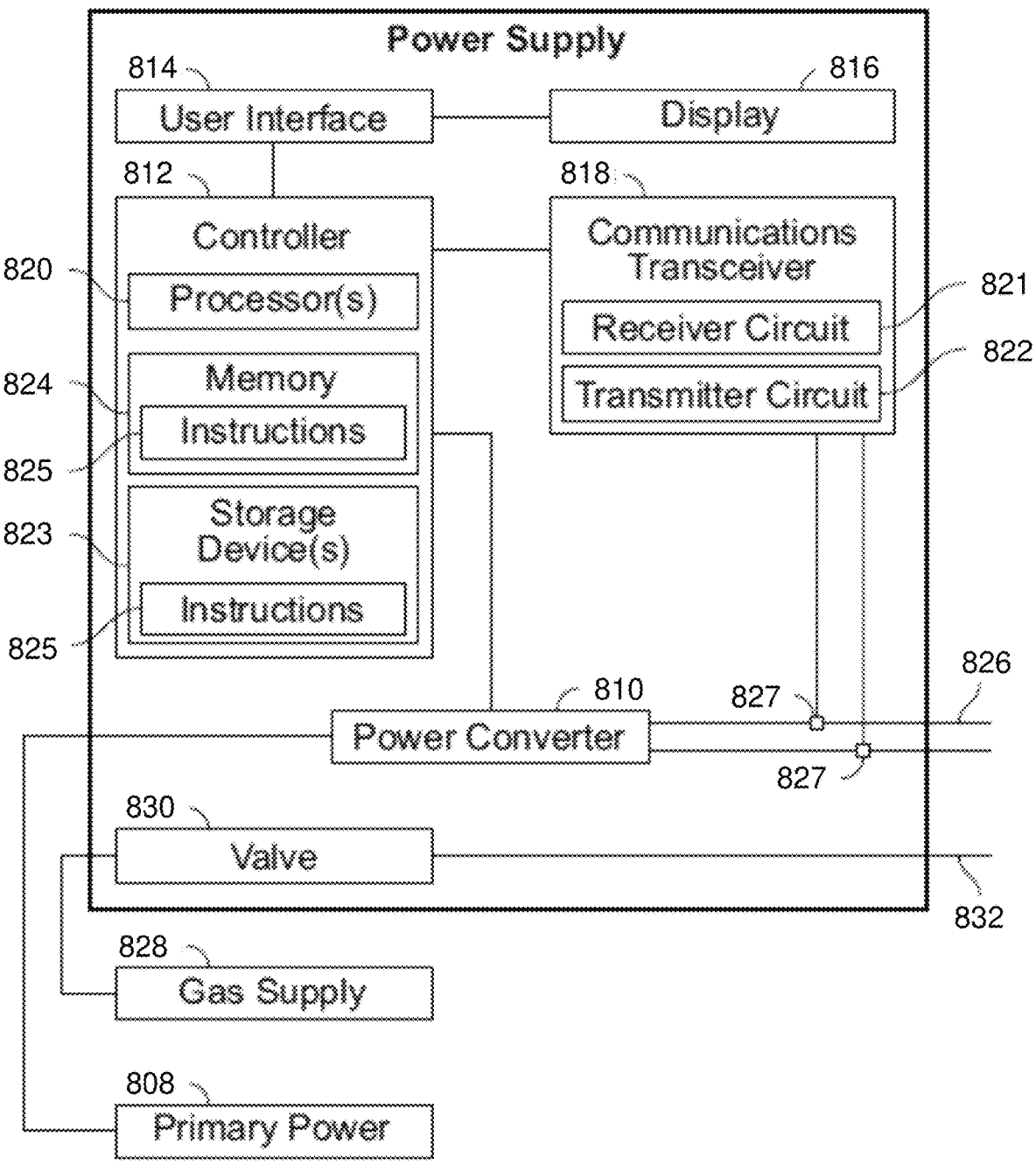
FIG. 8 is a block diagram of an example implementation of the power supplies of FIG. 2.

FIG. 8 is a block diagram of an example implementation of the power supplies 208, 210 of FIG. 2. The example power supply 208, 210 powers, controls, and supplies consumables to a welding application. In some examples, the power supply 208, 210 directly supplies input power to the welding torch 108. In the illustrated example, the power supply 208, 210 is configured to supply power to welding operations and/or preheating operations. The example power supply 208, 210 also provides power to a wire feeder to supply the electrode wire 114 to the welding torch 108 for various welding applications (e.g., GMAW welding, flux core arc welding (FCAW)).

The power supply 208, 210 receives primary power 808 (e.g., from the AC power grid, an engine/generator set, a battery, or other energy generating or storage devices, or a combination thereof), conditions the primary power, and provides an output power to one or more welding devices and/or preheating devices in accordance with demands of the system. The primary power 808 may be supplied from an offsite location (e.g., the primary power may originate from the power grid). The power supply 208, 210 includes a power converter 810, which may include transformers, rectifiers, switches, and so forth, capable of converting the AC input power to AC and/or DC output power as dictated by the demands of the system (e.g., particular welding processes and regimes). The power converter 810 converts input power (e.g., the primary power 808) to welding-type power based on a weld voltage setpoint and outputs the welding-type power via a weld circuit.

In some examples, the power converter 810 is configured to convert the primary power 808 to both welding-type power and auxiliary power outputs. However, in other examples, the power converter 810 is adapted to convert primary power only to a weld power output, and a separate auxiliary converter is provided to convert primary power to auxiliary power. In some other examples, the power supply 208, 210 receives a converted auxiliary power output directly from a wall outlet. Any suitable power conversion system or mechanism may be employed by the power supply 208, 210 to generate and supply both weld and auxiliary power.

The power supply 208, 210 includes a controller 812 to control the operation of the power supply 208, 210. The power supply 208, 210 also includes a user interface 814. The controller 812 receives input from the user interface 814, through which a user may choose a process and/or input desired parameters (e.g., voltages, currents, particular pulsed or non-pulsed welding regimes, and so forth). The user interface 814 may receive inputs using any input device, such as via a keypad, keyboard, buttons, touch screen, voice activation system, wireless device, etc. Furthermore, the controller 812 controls operating parameters based on input by the user as well as based on other current operating parameters. Specifically, the user interface 814 may include a display 816 for presenting, showing, or indicating, information to an operator. The controller 812 may also include interface circuitry for communicating data to other devices in the system, such as the wire feeder. For example, in some situations, the power supply 208, 210 wirelessly communicates with other welding devices within the welding system. Further, in some situations, the power supply 208, 210 communicates with other welding devices using a wired connection, such as by using a network interface controller (NIC) to communicate data via a network (e.g., ETHERNET, 10 baseT, 10 base 100, etc.). In the example of FIG. 8, the controller 812 communicates with the wire feeder via the weld circuit via a communications transceiver 818.

The controller 812 includes at least one controller or processor 820 that controls the operations of the welding power supply 802. The controller 812 receives and processes multiple inputs associated with the performance and demands of the system. The processor 820 may include one or more microprocessors, such as one or more "general-purpose" microprocessors, one or more special-purpose microprocessors and/or ASICS, and/or any other type of processing device. For example, the processor 820 may include one or more digital signal processors (DSPs).

The example controller 812 includes one or more storage device(s) 823 and one or more memory device(s) 824. The storage device(s) 823 (e.g., nonvolatile storage) may include ROM, flash memory, a hard drive, and/or any other suitable optical, magnetic, and/or solid-state storage medium, and/or a combination thereof. The storage device 823 stores data (e.g., data corresponding to a welding application), instructions (e.g., software or firmware to perform welding processes), and/or any other appropriate data. Examples of stored data for a welding application include an attitude (e.g., orientation) of a welding torch, a distance between the contact tip and a workpiece, a voltage, a current, welding device settings, and so forth.

The memory device 824 may include a volatile memory, such as random access memory (RAM), and/or a nonvolatile memory, such as read-only memory (ROM). The memory device 824 and/or the storage device(s) 823 may store a variety of information and may be used for various purposes. For example, the memory device 824 and/or the storage device(s) 823 may store processor executable instructions 825 (e.g., firmware or software) for the processor 820 to execute. In addition, one or more control regimes for various welding processes, along with associated settings and parameters, may be stored in the storage device 823 and/or memory device 824, along with code configured to provide a specific output (e.g., initiate wire feed, enable gas flow, capture welding current data, detect short circuit parameters, determine amount of spatter) during operation.

In some examples, the welding power flows from the power converter 810 through a weld cable 826. The example weld cable 826 is attachable and detachable from weld studs at each of the power supply 208, 210 (e.g., to enable ease of replacement of the weld cable 826 in case of wear or damage). Furthermore, in some examples, welding data is provided with the weld cable 826 such that welding power and weld data are provided and transmitted together over the weld cable 826. The communications transceiver 818 is communicatively coupled to the weld cable 826 to communicate (e.g., send/receive) data over the weld cable 826. The communications transceiver 818 may be implemented based on various types of power line communications methods and techniques. For example, the communications transceiver 818 may utilize IEEE standard P1901.2 to provide data communications over the weld cable 826. In this manner, the weld cable 826 may be utilized to provide welding power from the power supply 208, 210 to the wire feeder and the welding torch 108. Additionally or alternatively, the weld cable 826 may be used to transmit and/or receive data communications to/from the wire feeder and the welding torch 108. The communications transceiver 818 is communicatively coupled to the weld cable 826, for example, via cable data couplers 827, to characterize the weld cable 826, as described in more detail below. The cable data coupler 827 may be, for example, a voltage or current sensor.

In some examples, the power supply 208, 210 includes or is implemented in a wire feeder.

The example communications transceiver 818 includes a receiver circuit 821 and a transmitter circuit 822. Generally, the receiver circuit 821 receives data transmitted by the wire feeder via the weld cable 826 and the transmitter circuit 822 transmits data to the wire feeder via the weld cable 826. As described in more detail below, the communications transceiver 818 enables remote configuration of the power supply 208, 210 from the location of the wire feeder and/or compensation of weld voltages by the power supply 208, 210 using weld voltage feedback information transmitted by the wire feeder 104. In some examples, the receiver circuit 821 receives communication(s) via the weld circuit while weld current is flowing through the weld circuit (e.g., during a welding-type operation) and/or after the weld current has stopped flowing through the weld circuit (e.g., after a welding-type operation). Examples of such communications include weld voltage feedback information measured at a device that is remote from the power supply 208, 210 (e.g., the wire feeder) while the weld current is flowing through the weld circuit Example implementations of the communications transceiver 818 are described in U.S. Pat. No. 9,012,807. The entirety of U.S. Pat. No. 9,012,807 is incorporated herein by reference. However, other implementations of the communications transceiver 818 may be used.

The example wire feeder 104 also includes a communications transceiver 819, which may be similar or identical in construction and/or function as the communications transceiver 818.

In some examples, a gas supply 828 provides shielding gases, such as argon, helium, carbon dioxide, and so forth, depending upon the welding application. The shielding gas flows to a valve 830, which controls the flow of gas, and if desired, may be selected to allow for modulating or regulating the amount of gas supplied to a welding application. The valve 830 may be opened, closed, or otherwise operated by the controller 812 to enable, inhibit, or control gas flow (e.g., shielding gas) through the valve 830. Shielding gas exits the valve 830 and flows through a cable 832 (which in some implementations may be packaged with the welding power output) to the wire feeder which provides the shielding gas to the welding application. In some examples, the power supply 208, 210 does not include the gas supply 828, the valve 830, and/or the cable 832.

The present devices and/or methods may be realized in hardware, software, or a combination of hardware and software. The present methods and/or systems may be realized in a centralized fashion in at least one computing system, processors, and/or other logic circuits, or in a distributed fashion where different elements are spread across several interconnected computing systems, processors, and/or other logic circuits. Any kind of computing system or other apparatus adapted for carrying out the methods described herein is suited. A typical combination of hardware and software may be a processing system integrated into a welding power supply with a program or other code that, when being loaded and executed, controls the welding power supply such that it carries out the methods described herein. Another typical implementation may comprise an application specific integrated circuit or chip such as field programmable gate arrays (FPGAs), a programmable logic device (PLD) or complex programmable logic device (CPLD), and/or a system-on-a-chip (SoC). Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine readable medium" is defined to include all types of machine readable storage media and to exclude propagating signals.

An example control circuit implementation may be a microcontroller, a field programmable logic circuit and/or any other control or logic circuit capable of executing instructions that executes weld control software. The control circuit could also be implemented in analog circuits and/or a combination of digital and analog circuitry.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

All documents cited herein, including journal articles or abstracts, published or corresponding U.S. or foreign patent applications, issued or foreign patents, or any other documents are each entirely incorporated by reference herein, including all data, tables, figures, and text presented in the cited documents.

What is claimed is:

1. A wire preheating assembly, comprising:
a first electrical contact configured to contact an electrode wire over a first contact length of the first electrical contact; and
a second electrical contact configured to contact the electrode wire over a second contact length of the second electrical contact;
wherein a ratio of the first contact length to a distance between the first and second contact lengths is greater than 0 and less than or equal to 1.

2. The wire preheating assembly as defined in claim 1, wherein the first electrical contact has a first body length and the second electrical contact has a second body length, the first contact length being less than the first body length and the second contact length being less than the second body length.

3. The wire preheating assembly as defined in claim 1, wherein the first electrical contact comprises a first bore having a first inner diameter along the first contact length, and the second electrical contact comprises a second bore having a second inner diameter along the second contact length.

4. The wire preheating assembly as defined in claim 3, wherein the first electrical contact comprises a third bore and the second electrical contact comprises a fourth bore, wherein the first bore and the second bore are aligned such that the electrode wire traveling through the wire preheating assembly does not contact the third bore or the fourth bore.

5. The wire preheating assembly as defined in claim 1, further comprising an electrically insulating spacer between the first and second contact tips.

6. The wire preheating assembly as defined in claim 5, wherein the first electrical contact, the second electrical contact, and the spacer are rigidly coupled.

7. The wire preheating assembly as defined in claim 1, wherein a ratio of the first contact length to a distance between the first and second contact lengths is greater than 0 and less than or equal to 0.15.

8. A contact tip assembly for a welding torch, the contact tip assembly comprising:
a first contact tip configured to contact an electrode wire over a first contact length of the first contact tip; and
a second contact tip configured to contact the electrode wire over a second contact length of the second contact tip;
wherein a ratio of the second contact length to the distance between the first and second contact lengths is greater than 0 and less than or equal to 1.

9. The contact tip assembly as defined in claim 8, wherein the ratio of the second contact length to a distance between the first and second contact lengths is greater than 0 and less than or equal to 0.15.

10. A consumable electrode-fed welding-type system, comprising:
a welding-type power source configured to provide welding-type current to a welding-type circuit, the welding-type circuit comprising a welding-type electrode and a first electrical contact configured to contact an electrode wire over a first contact length of the first electrical contact;
an electrode preheating circuit configured to provide preheating current through a first portion of the welding-type electrode via a second electrical contact configured to contact the electrode wire over a second contact length of the second electrical contact; and
electrode preheat control circuitry configured to control the electrode preheating circuit, wherein a ratio of the second contact length to the distance between the first and second contact lengths is greater than 0 and less than or equal to 1.

11. The welding-type system as defined in claim 10, wherein the ratio of the second contact length to a distance between the first and second contact lengths is greater than 0 and less than or equal to 0.15.

12. The welding-type system as defined in claim 10, wherein the electrode preheat control circuitry is configured to control the electrode preheating circuit based on at least one of a target preheat voltage, a target preheat current, a target preheat enthalpy, a target preheat resistance, or a target wire temperature.

13. A consumable electrode-fed welding-type system, comprising:
a welding-type power source configured to provide welding-type current to a welding-type circuit, the welding-type circuit comprising a welding-type electrode and a first electrical contact configured to contact an electrode wire over a first contact length of the first electrical contact;
an electrode preheating circuit configured to provide preheating current through a first portion of the welding-type electrode via a second electrical contact configured to contact the electrode wire over a second contact length of the second electrical contact; and
electrode preheat control circuitry configured to control a preheating voltage of the electrode preheating circuit, wherein a ratio of the first contact length to the distance between the first and second contact lengths is greater than 0 and less than or equal to 1.

14. The welding-type system as defined in claim 13, wherein the ratio of the first contact length to a distance between the first and second contact lengths is greater than 0 and less than or equal to 0.15.

15. The welding-type system as defined in claim 13, wherein the electrode preheat control circuitry is configured to control the preheating voltage based on at least one of the first contact length, the second contact length, or a total of the first and second contact lengths, and a distance between the first electrical contact and the second electrical contact.

16. The welding-type system as defined in claim 13, wherein a ratio of the second contact length of the second electrical contact to the distance between the first and second contact lengths is greater than 0 and less than or equal to 1.

17. The welding-type system as defined in claim 16, wherein the ratio of the second contact length to a distance between the first and second contact lengths is greater than 0 and less than or equal to 0.15.

* * * * *